US012619455B2

(12) United States Patent　　　　　(10) Patent No.:　US 12,619,455 B2
Tsirkin et al.　　　　　　　　　　　　(45) Date of Patent:　　May 5, 2026

(54) ROBUST RESOURCE REMOVAL FOR VIRTUAL MACHINES

(71) Applicant: Red Hat, Inc., Raleigh, NC (US)

(72) Inventors: Michael Tsirkin, Haifa (IL); Karen Lee Noel, Pembroke, NH (US)

(73) Assignee: Red Hat, Inc., Raleigh, NC (US)

( * ) Notice: Subject to any disclaimer, the term of this patent is extended or adjusted under 35 U.S.C. 154(b) by 953 days.

(21) Appl. No.: 17/568,591

(22) Filed: Jan. 4, 2022

(65) Prior Publication Data

US 2023/0214247 A1　　Jul. 6, 2023

(51) Int. Cl.
　　G06F 9/455　　　　(2018.01)
　　G06F 9/4401　　　(2018.01)
　　G06F 11/1482　　(2026.01)

(52) U.S. Cl.
　　CPC ........ G06F 9/45558 (2013.01); G06F 9/4411 (2013.01); G06F 9/45545 (2013.01); G06F 11/1484 (2013.01); *G06F 2009/45575* (2013.01); *G06F 2009/45583* (2013.01)

(58) Field of Classification Search
None
See application file for complete search history.

(56) References Cited

U.S. PATENT DOCUMENTS 8,321,617 B1 *　11/2012　Haga ..................... G06F 13/385
　　　　　　　　　　　　　　　　　　　　　710/316
8,429,675 B1 *　4/2013　Radhakrishnan ..... G06F 9/5077
　　　　　　　　　　　　　　　　　　　　　719/319

8,589,940 B2　　11/2013　Lim et al.
8,667,496 B2　　3/2014　Levin
8,789,069 B2　　7/2014　Green et al.
8,856,788 B2 *　10/2014　Tsirkin ................ G06F 9/45558
　　　　　　　　　　　　　　　　　　　　718/1
8,910,152 B1 *　12/2014　Hyser ................. G06F 9/45558
　　　　　　　　　　　　　　　　　　　　718/1
9,015,709 B2 *　4/2015　Voccio ................ G06F 9/45533
　　　　　　　　　　　　　　　　　　　　718/1
9,396,004 B1 *　7/2016　Bester ................. G06F 9/45533
9,817,688 B2 *　11/2017　Kaplan ............... G06F 11/3452
10,394,586 B2　8/2019　Tsirkin
(Continued)

OTHER PUBLICATIONS

Wang, et al., "Application-Aware Cross-layer Virtual Machine Resource Management" Proceedings of the 9th International Conference on Autonomic Computing, Sep. 18-20, 2012, pp. 13-22, Miami, FL, USA.

(Continued)

*Primary Examiner* — Hiren P Patel

(74) *Attorney, Agent, or Firm* — Womble Bond Dickinson (US) LLP

(57)　　　　　ABSTRACT

Systems and methods providing robust resource removal for virtual machines. In one implementation, a hypervisor may receive configuration data associated with a virtual machine (VM). The hypervisor may determine, based on the configuration data, a type of support by the VM of recovery from unexpected hardware resource removal. The hypervisor may identify, based on the type of support of recovery form unexpected hardware resource removal, a type of access of the VM to one or more hardware resources. The hypervisor may launch the VM according to the type of access to the one or more hardware resources.

20 Claims, 6 Drawing Sheets

(56) References Cited

U.S. PATENT DOCUMENTS

| | | | | |
|---|---|---|---|---|
| 10,496,424 | B2 * | 12/2019 | Shah | G06F 9/45558 |
| 10,698,784 | B2 * | 6/2020 | Tsirkin | G06F 11/0745 |
| 11,093,275 | B2 * | 8/2021 | Tsirkin | G06F 9/4411 |
| 11,822,948 | B2 * | 11/2023 | Tsirkin | G06F 9/45558 |
| 12,056,538 | B1 * | 8/2024 | Ozerkov | G06F 9/5077 |
| 2010/0211958 | A1 | 8/2010 | Madison, Jr. et al. | |
| 2011/0023028 | A1 * | 1/2011 | Nandagopal | G06F 9/45533 |
| | | | | 718/1 |
| 2011/0126198 | A1 * | 5/2011 | Vilke | G06F 9/45558 |
| | | | | 709/227 |
| 2012/0278818 | A1 * | 11/2012 | Green | G06F 9/45558 |
| | | | | 718/1 |
| 2013/0055254 | A1 * | 2/2013 | Avasthi | G06F 9/5077 |
| | | | | 718/1 |
| 2013/0326505 | A1 * | 12/2013 | Shah | G06F 8/61 |
| | | | | 718/1 |
| 2014/0068606 | A1 * | 3/2014 | Tsirkin | G06F 9/45558 |
| | | | | 718/1 |
| 2014/0373010 | A1 | 12/2014 | Folco et al. | |
| 2015/0033227 | A1 * | 1/2015 | Lin | G06F 9/45533 |
| | | | | 718/1 |
| 2017/0046187 | A1 * | 2/2017 | Tsirkin | G06F 9/45558 |
| 2017/0187694 | A1 * | 6/2017 | Friedman | G06F 21/606 |
| 2017/0293538 | A1 * | 10/2017 | Seenappa | G06F 11/14 |
| 2018/0011728 | A1 * | 1/2018 | Nasu | G06F 9/5027 |
| 2019/0121745 | A1 * | 4/2019 | Hoppert | G06F 9/45558 |
| 2020/0341785 | A1 * | 10/2020 | Tsirkin | G06F 9/45558 |
| 2023/0067904 | A1 * | 3/2023 | Kumar | G06F 3/0673 |

OTHER PUBLICATIONS

He et al., "Elastic Application Container: A Lightweight Approach for Cloud Resource Provisioning," Proceedings of International Conference on Advanced Information Networking and Applications, Mar. 2012, pp. 15-22, London, United Kingdom.

Andreolini et al., "Dynamic Load Management of Virtual Machines in Cloud Architectures," Cloud Computing. CloudComp 2009. Lecture Notes of the Institute for Computer Sciences, Department of Information Engineering, University of Modena and Reggio Emilia, Italy, 14 pages.

* cited by examiner

300

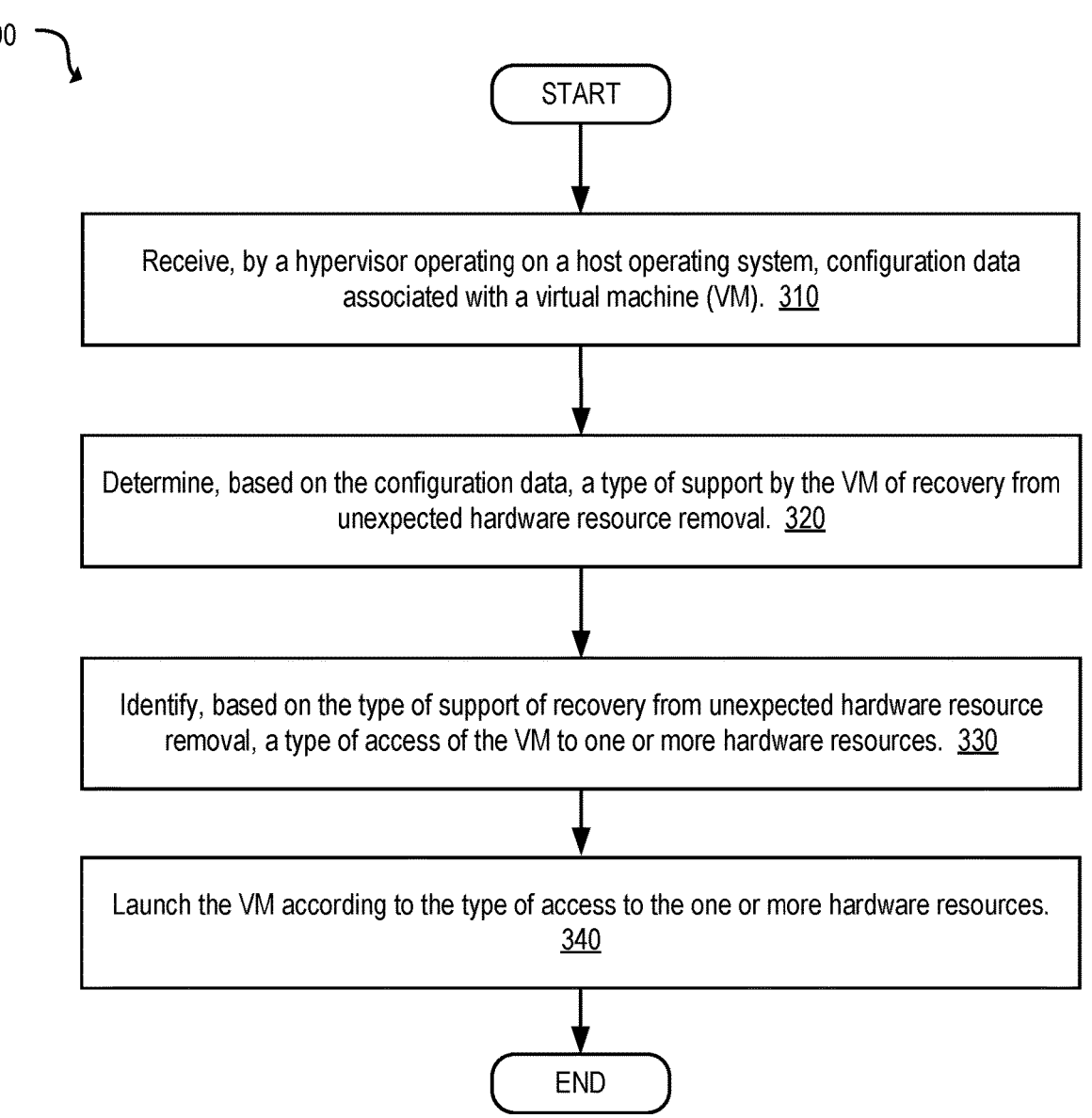

START

Receive, by a hypervisor operating on a host operating system, configuration data associated with a virtual machine (VM). 310

Determine, based on the configuration data, a type of support by the VM of recovery from unexpected hardware resource removal. 320

Identify, based on the type of support of recovery from unexpected hardware resource removal, a type of access of the VM to one or more hardware resources. 330

Launch the VM according to the type of access to the one or more hardware resources. 340

END

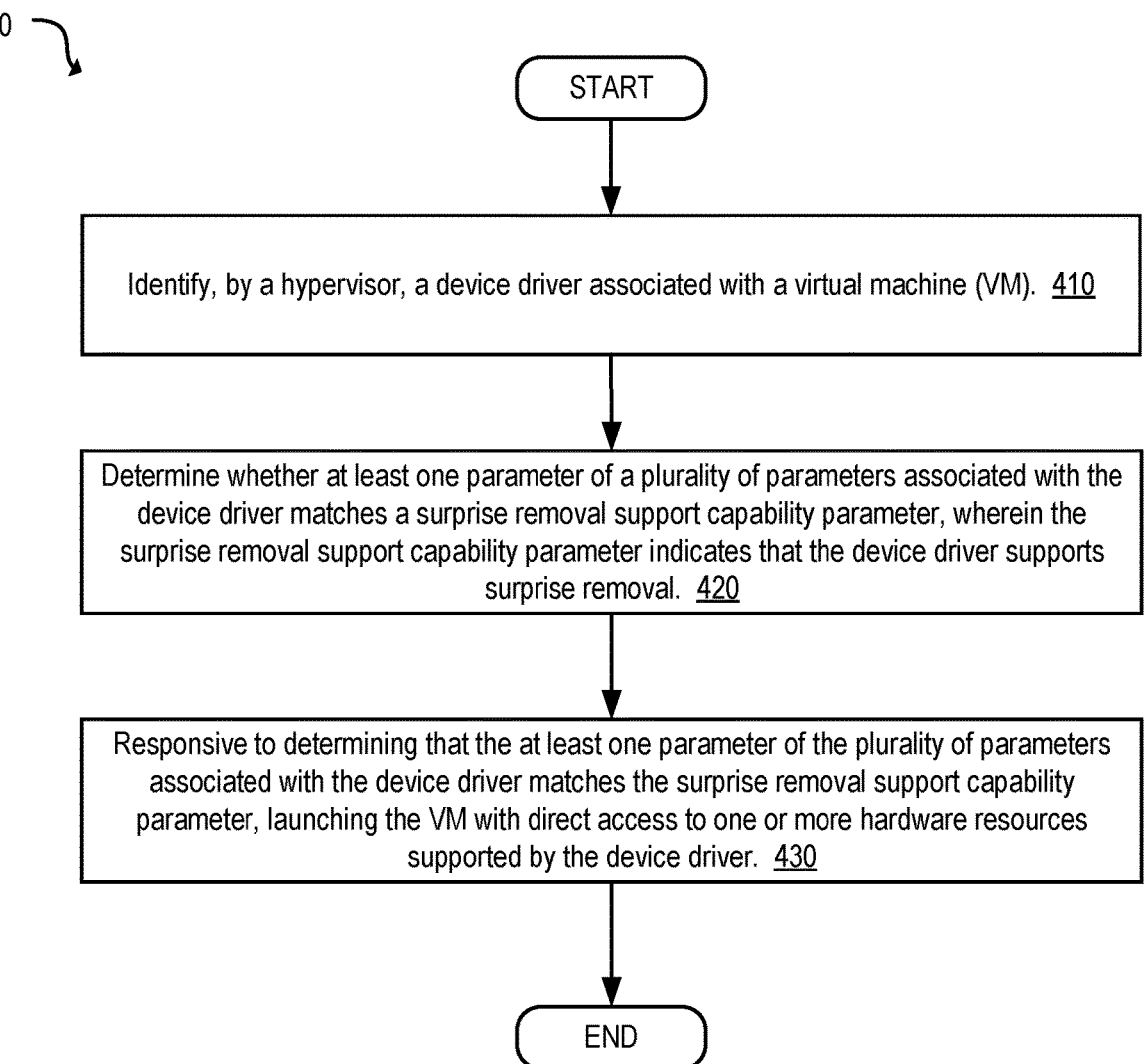

START

Identify, by a hypervisor, a device driver associated with a virtual machine (VM). 410

Determine whether at least one parameter of a plurality of parameters associated with the device driver matches a surprise removal support capability parameter, wherein the surprise removal support capability parameter indicates that the device driver supports surprise removal. 420

Responsive to determining that the at least one parameter of the plurality of parameters associated with the device driver matches the surprise removal support capability parameter, launching the VM with direct access to one or more hardware resources supported by the device driver. 430

END

PROCESSING DEVICE  501

HELPER VM MODULE
510

TYPE OF SUPPORT
MODULE
515

TYPE OF ACCESS
MODULE
520

VM LAUNCHER
MODULE
525

RESOURCE
REMOVAL MODULE
530

MEMORY 502

TYPE OF ACCESS DATA  504

TYPE OF SUPPORT DATA 506

ROBUST RESOURCE REMOVAL FOR VIRTUAL MACHINES

TECHNICAL FIELD

The present disclosure is generally related to virtualization systems, and more particularly, to robust resource removal for virtual machines.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests," providing a variety of functions such as virtualizing and allocating resources, context switching among virtual machines, etc. The operating system (OS) of the virtual machine is typically referred to as the "guest operating system."

In a virtualized environment, physical devices, such as network devices or video cards, can be made available to guests by the hypervisor by a process known as device assignment. The hypervisor can create a virtual device within the guest that is associated with the physical device so that any access of the virtual device can be forwarded to the physical device by the hypervisor with little or no modification. Removal of a device from an assigned guest OS without warning (e.g., by simply unplugging it without using a device manager or removal utility), is referred to as "surprise removal."

BRIEF DESCRIPTION OF THE DRAWINGS

The present disclosure is illustrated by way of example, and not by way of limitation, and can be more fully understood with reference to the following detailed description when considered in connection with the figures in which:

FIG. 3 is a flow diagram of an example method of providing robust resource removal for VMs, in accordance with one or more aspects of the present disclosure.

FIG. 4 is a flow diagram of an example method for determining the surprise removal capability of a VM using an exposed parameter, in accordance with one or more aspects of the present disclosure.

DETAILED DESCRIPTION

Figure 1:
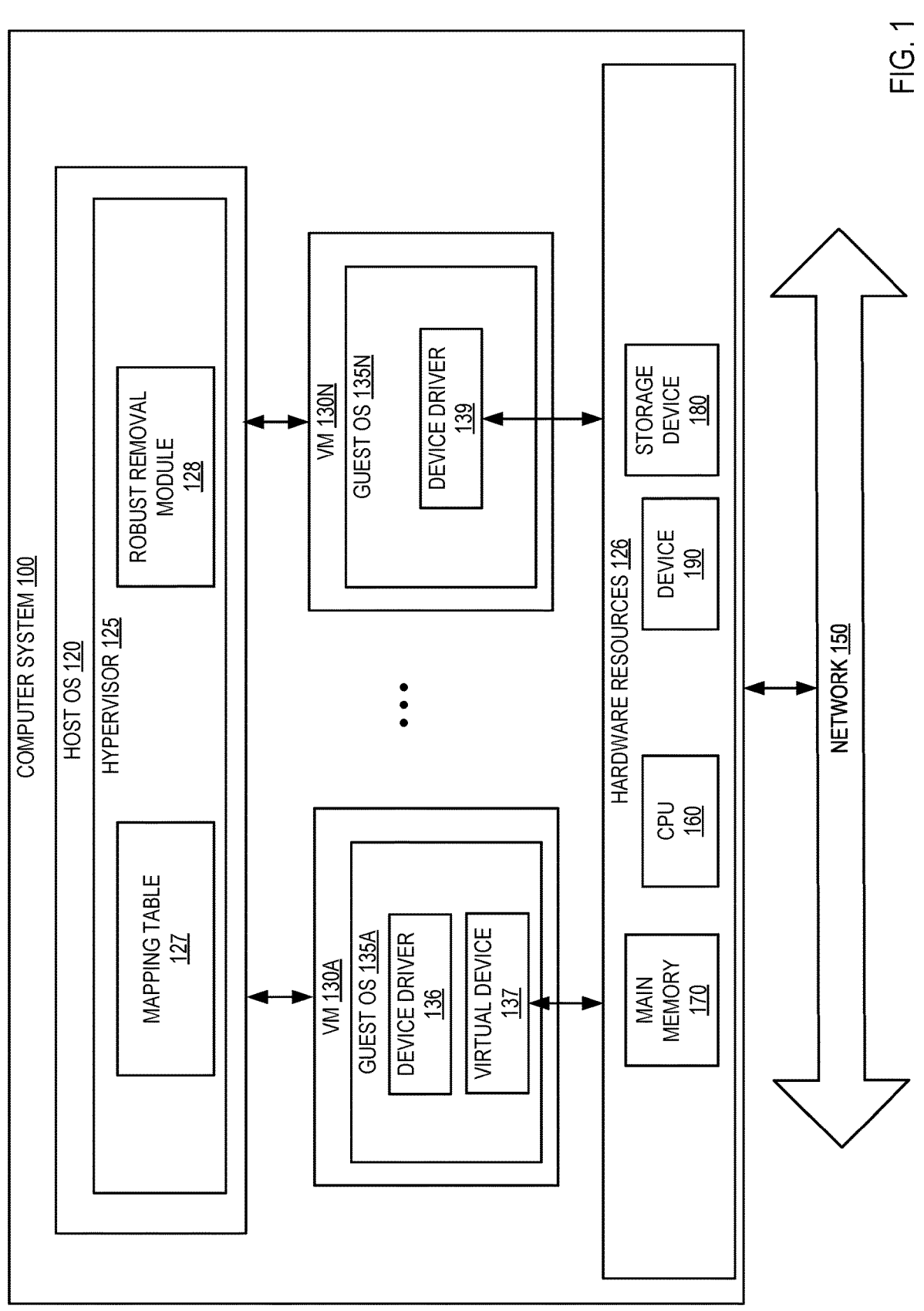
FIG. 1 depicts a block diagram of an example computer system architecture operating in accordance with one or more aspects of the present disclosure.

Implementations of the disclosure are directed to providing robust resource removal for virtual machines (VMs). In a virtualized environment, removal of a virtual device from a host computer system can sometimes occur for reasons of reliability (due to guest OS or host OS instability) or resource overcommit (e.g., when a host OS is short on resources consumed by the guest OS) to free resources for use by different virtual machines or hosts. Typically, removal of a virtual device (such as a Peripheral Component Interconnect (PCI) device) from a VM involves sending a removal notification from the hypervisor to the guest OS of the VM and receiving an explicit acknowledgment from the guest OS that indicates that the guest OS has entered a state in which it is safe to remove the device. The acknowledgment from the guest OS avoids guest OS errors as a result of the device removal prior to the guest OS (also referred to herein as "guest") flushing any associated cache to avoid losing data. For example, the removal of a disk could result in the loss of critical data, or the removal of a network interface controller could result in the loss of networking communication packet information. However, this removal process may be time consuming, particularly if the guest is slow or the guest is not operating properly.

Some VMs, however, are capable of supporting the surprise removal of physical devices. That is, some VMs include systems that enable the VM to recover from a surprise removal of hardware resources of an assigned physical device. For VMs that support surprise removal, the removal process of having the hypervisor send a removal notification to the VM's guest OS, and waiting for explicit approval from the VM's guest OS, can be redundant and unnecessarily time consuming.

Aspects of the present disclosure address the above-noted and other deficiencies by implementing robust resource removal for VMs that support surprise removal. The hypervisor, prior to launching a VM, can determine whether the VM supports surprise removal. In embodiments, the hypervisor can launch a special helper VM prior to launching the VM. The special helper VM can have access to the memory of the VM, and can identify configuration data within the memory of the VM. The special helper VM can send the configuration data to the hypervisor. The hypervisor can determine, based on the configuration data, whether the VM supports surprise removal. For example, the configuration data can include the version of the guest OS installed on the VM, the list of drivers installed on the VM, and/or the version number of the driver(s) installed on the VM. The hypervisor can identify an entry in a data structure corresponding to the configuration data to determine whether the guest OS and/or the drivers installed on the VM support surprise removal. For example, the hypervisor can identify one or more entries in a data structure that corresponds to the driver(s) version number(s), and/or to the guest OS version number. The one or more entries can specify whether surprise removal is supported (i.e., whether the guest OS and/or driver(s) have the capability to recover from the removal of a resource at an arbitrary time, and/or without warning).

In some embodiments, the hypervisor can determine whether the VM supports surprise removal by exposing a driver capability. In embodiments, the driver capability can be exposed using a special parameter (e.g., a surprise removal support capability parameter). The hypervisor can access one or more drivers installed on the VM prior to launching the VM. The drivers can, for example, control a particular physical device assigned to the VM. The hypervisor can determine whether a surprise removal support capability parameter is found in the list of parameters of the driver. If the surprise removal support capability parameter is present, the hypervisor can determine that the driver (and hence, the VM on which the driver is installed) supports surprise removal. If the surprise removal support capability parameter is not present in the driver, the hypervisor can determine that the driver does not support surprise removal.

Responsive to determining that the VM supports surprise removal, the hypervisor can launch the VM with direct access to the hardware resources and/or physical devices. That is, the hypervisor can enable the VM to access the hardware resources and/or physical devices directly (e.g., via mapping the device memory to the VM virtual memory address range), rather than through a virtual device. If the direct access is enabled, physical devices and/or hardware resources can be removed from the VM without implementing the time consuming removal process, i.e., without sending a removal notification to the VM's guest OS and waiting for explicit approval from the VM's guest OS. For example, physical devices can be assigned to the VM using hardware mapping (e.g., memory page tables) such that interrupts can be forwarded to the physical device using interruption injection. That is, the VM can communicate with the assigned physical device(s) without host involvement. If, however, the hypervisor determines that the VM does not support surprise removal, the hypervisor can launch the VM with access to the hardware resources and/or physical devices via a virtual device. That is, the hypervisor can create a virtual device through which the VM can access the hardware resources and/or physical devices. The hypervisor can store, in hypervisor memory, a surprise removal capability indicator associated with the VM that indicates whether the VM supports surprise removal.

In embodiments, the hypervisor can determine that a hardware resource and/or a physical device is to be removed from a VM (e.g., for load balancing purposes). The hypervisor can determine whether the VM supports surprise removal. In embodiments, the hypervisor can identify the surprise removal capability associated with the VM from which a physical device and/or hardware resource is to be removed. If the hypervisor determines that the VM supports surprise removal, the hypervisor can deallocate the physical device and/or hardware resource by suspending the VM and removing the physical device and/or hardware resource, which may involve unmapping the device assignment in a mapping data structure. As another example, the hypervisor can remove the physical device and/or hardware resource without suspending the VM. If the hypervisor determines that the VM does not support surprise removal, the hypervisor can remove the physical device and/or hardware resource without suspending the VM, e.g., by disabling the corresponding virtual device. In such instances, the virtual device can maintain stable operation of the VM while the hypervisor deallocates physical devices and/or hardware resources. The hypervisor can unmap the physical devices and/or hardware resources from the VM, thus allowing the hypervisor to reallocate the physical devices and/or hardware resources to other VMs.

Aspects of the present disclosure present advantages over conventional solutions to the issues noted above. By determining that a VM supports surprise removal prior to launching the VM, aspects of the present disclosure enable a hypervisor to launch the VM with direct access to hardware resources and/or physical devices, thus bypassing the time consuming and cumbersome removal process of conventional solutions. As a result, aspects of the present disclosure provide for improved overall performance in the virtualized environment.

FIG. 1 is a block diagram of a computer system 100, in which embodiments of the present disclosure may operate. One skilled in the art will appreciate that other architectures for computer system 100 are possible, and that the implementation of a computer system utilizing examples of the invention are not necessarily limited to the specific architecture depicted by FIG. 1.

The network architecture 100 is connected to a network 150 and comprises one or more hardware resources 126. The hardware resources can include one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect (PCI) solid state drive, a Redundant Array of Independent Disks (RAID) system, a network attached storage (NAS) array, etc.), and one or more devices 190 (e.g., a Peripheral Component Interconnect (PCI) device, network interface controller (NIC), a video card, an input/output device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of computer system 100 may comprise a plurality of CPUs, storage devices, and devices.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise one or more virtual machines (VMs) 130A-N and host operating system (OS) 120. VM 130A-N is a software implementation of a machine that executes programs as though it was an actual physical machine. Host OS 120 manages the hardware resources of the computer system and provides functions such as inter-process communication, scheduling, memory management, and so forth.

VM 130A-N may include a guest operating system (OS) 135A-N that handles the execution of applications within the virtual machine. Guest OS 135A-N may control a device 190 through device driver 136, 139. Host OS 120 may include a hypervisor 125, which provides a virtual operating platform for VMs 130A-N and manages their execution. Hypervisor 125 may comprise mapping table 127 and robust removal module 128. It should be noted that in some alternative implementations, hypervisor 125 may be external to host OS 120, rather than embedded within host OS 120, or may replace host OS 120.

Robust removal module 128 can determine whether a VM 130A-N supports surprise removal of one or more hardware resources 126. The determination process is further described with respect to FIGS. 2-4. In an illustrative example, the robust removal module 128 can determine that VM 130A does not support surprise removal of hardware resources 126. In some embodiments, robust removal module 128 can determine that VM 130A does not support surprise removal by launching a helper VM (not pictured), which is a minimal footprint virtual machine that has access to the memory allocated to the VM 130A. Once launched, the helper VM can retrieve relevant configuration data from the memory allocated to the VM 130A and send the configuration data for VM 130A to robust removal module 128.

The configuration data can include a version of guest OS 135A-N, a list of drivers installed on the VM 130A-N, the version number(s) of the driver(s) installed on the VM 130A-N (e.g. device driver 136 version number, and/or device driver 139 version number), and/or the vendor of the driver(s) installed on the VM 130A-N the configuration data can include the version of the guest OS installed on the VM, the list of drivers installed on the VM, and/or the version number of the driver(s) installed on the VM. Based on the configuration data, the robust removal module 128 can determine whether the VM 130A-N supports surprise removal, as is further described with respect to FIG. 2. In some embodiments, robust removal module 128 can access a device driver 136 to determine whether VM 130A supports surprise removal, as is further described with respect to FIG. 2.

Responsive to determining that VM 130A does not support surprise removal of hardware resources 126, hypervisor 125 can launch VM 130A including a virtual device 137. That is, hypervisor 125 can associate a hardware resource 126 with guest OS 135A by creating a virtual device 137 that is accessible by the VM 130A, where the virtual device 137 is associated with the hardware resource 126 (e.g., device 190). Any access of the virtual device 137 by the guest operating system 135A of the VM 130A can be forwarded to the hardware resource 126 by hypervisor 125. In certain implementations, the hardware resource 126 can be a Peripheral Component Interconnect (PCI) device (e.g., a network interface controller (NIC), an Integrated Graphics Device (IGD), etc.). Creating a virtual device can involve running, within the hypervisor context, a software module that would intercept the VM communications with the physical device (e.g., by modifying the VM page table in order to intercept memory accesses to the memory buffer that is assigned to the physical device) and running a corresponding device driver within the virtual machine.

In embodiments, robust removal module 128 can determine that VM 130N does support surprise removal of hardware resources 126. Hypervisor 125 can launch VM 130N with direct access to hardware resources 126. Direct access to hardware resources 126 enables the VM 130N to communicate with hardware resources 126 without involving the host OS 120. For example, hypervisor 125 can map the memory of the device providing the hardware resource 126 to the VM 130N virtual memory address range. For example, interrupts from VM 130N can be forwarded to device 190 using direct interruption injection. That is, VM 130N can communicate with the assigned hardware resources 126 directly, without going through host OS 120. For example, using direct access, device driver 139 can send an interrupt directly to device 190, without involving host OS 120 (e.g., by injecting the interrupt message into a vCPU associated with the VM).

In-band interrupt signaling, also referred to as message signaled interrupts (MSI), involves transmitting, by a peripheral device, a message through the main data path (e.g., through a Peripheral Component Interconnect (PCI) bus). The MSI mechanism allows a peripheral device to write, to a special memory address mapped to a control register of an interrupt controller, certain data. Each unique combination of the address and data defines an interrupt vector. The interrupt controller processes the data to determine which interrupt to trigger on which processor and delivers the interrupt to the processor (e.g., to a vCPU associated with the VM).

In embodiments, robust removal module 128 can save a capability indicator value associated with the surprise removal support of VMs 130A-N in mapping table 127. The capability indicator can store a value to indicate whether a corresponding VM 130A-N supports surprise removal of one or more hardware device 126. Mapping table 127 can contained an identifier for VM 130A-N, an identifier for the hardware resources 126, the surprise removal capability indicator value(s), and/or any similar information. Mapping table 127 can be stored in an area of hypervisor memory accessible to robust removal module 128, a shared memory space, a data structure saved in storage device 180, or the like. Mapping table 127 can be, for example, PCI forwarding tables and/or CPU memory tables.

Figure 2:
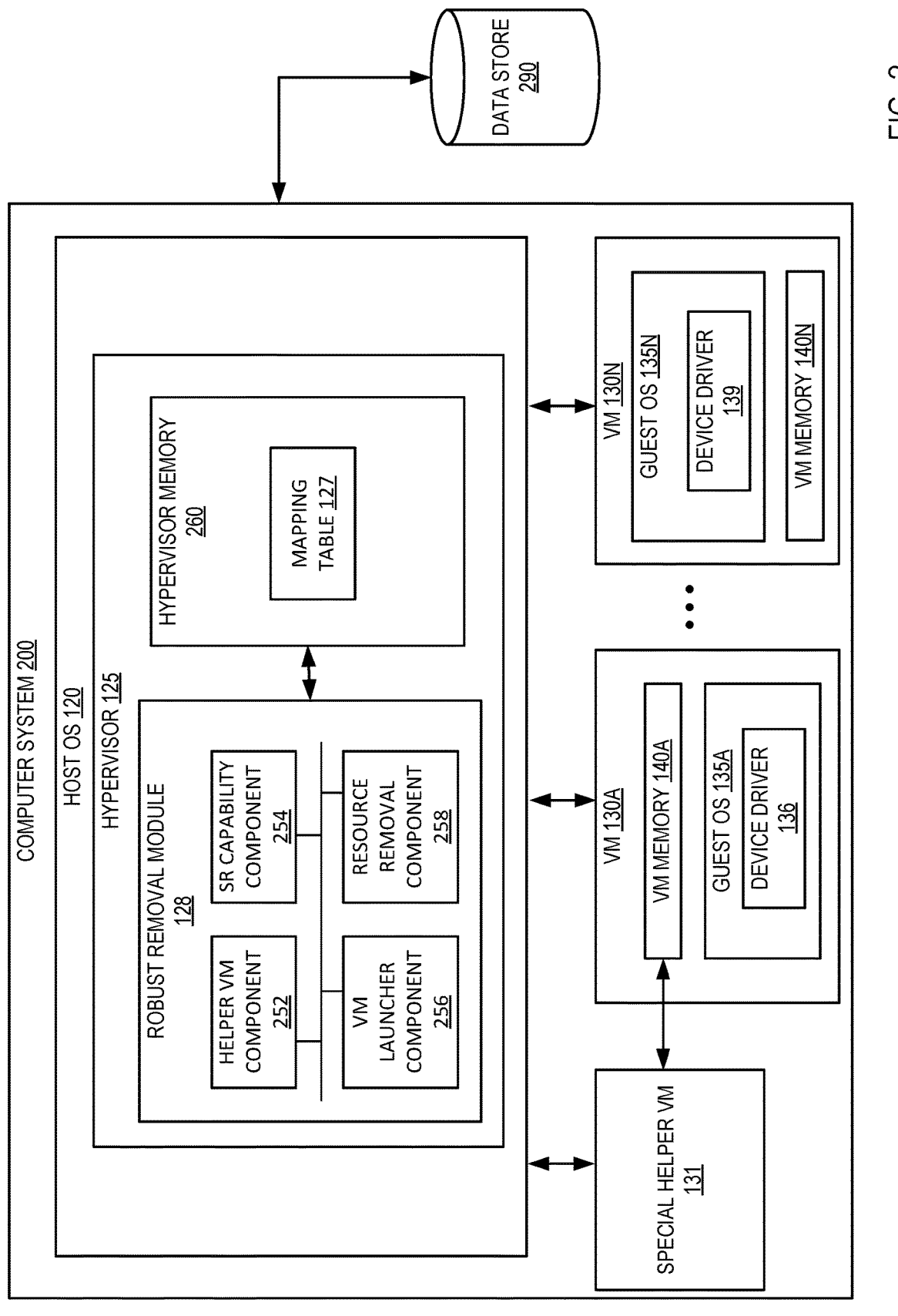
FIG. 2 depicts a block diagram illustrating a computer system operating in accordance with one or more aspects of the present disclosure.

FIG. 2 depicts a block diagram of a computer system 200 operating in accordance with one or more aspects of the present disclosure. Computer system 200 may perform the same functions as computer system 100 of FIG. 1. Computer system 200 may include a host OS 120, and a hypervisor 125. Computer system 200 may be connected to a data store 290. In embodiments, data store 290 can be included within computer system 200. The hypervisor 125 can manage one or more VMs 130A-N, and optionally a special helper VM 131.

Hypervisor 125 may include a robust removal module 128 and hypervisor memory 260. The robust removal module 128 may include a helper VM component 252, a surprise removal (SR) capability component 254, a virtual device component 256, and/or a surprise removal component 258. In embodiments, the helper VM component 252 can launch a special helper VM 131. The special helper VM 131 can be tasked with identifying configuration data of one or more VMs 130A-130N, and transmitting the configuration data to hypervisor 125. The hypervisor 125 can grant the special helper VM 131 access to the VM memory 140A of VM 130A. The VM memory 140A can include one or more driver binaries of the drivers stored on VM 130A. For example, VM memory 140A can store the driver binary for device driver 136. Additionally or alternatively, the VM memory 140A can store configuration data for the guest OS 135A, for the device driver 136, and/or for other drivers installed on VM 130A. The configuration data can include the version number or an identification number of guest OS 135A, a version number of the device driver 136 and/or other drivers installed on VM 130A, or some other configuration data of VM 130A. The special helper VM 131 can identify the information in VM memory 140A that indicates whether the VM 130A supports surprise removal. The helper VM component 252 can instruct the special helper VM 131 on what information (e.g., configuration data) to identify. The special helper VM 131 can transmit the information to helper VM robust removal module 128.

The SR capability component 254 can determine whether the VM 130A-N supports surprise removal. In embodiments, the SR capability component 254 can use the information (e.g., configuration data) received from special helper VM 131 to determine whether the VM 130A-N supports surprise removal. The SR capability component 254 can identify one or more entries in a data structure in data store 290, wherein the entry is associated with the configuration data received from the special helper VM 131. In embodiments, the data structure in data store 290 can be an operating system information database, such as libosinfo. The data structure can include metadata about operating systems and/or drivers. The SR capability component 254 can query the data structure to determine various capabilities of the guest OS 135A-N and/or device driver 136, 139, and/or of other drivers installed on VMs 130A-N. The SR capability component 254 can query the data structure based on the configuration data received from special helper VM 131. For example, the SR capability component 254 can use one piece of the configuration data received from special helper VM 131 (e.g., the version of guest OS 135A) as a key in the data structure to identify the capabilities of the guest OS 135A. For example, the data structure can include an entry associated with the version of guest OS 135A, and the entry can indicate whether that particular version of guest OS 135A supports surprise removal.

In some embodiments, the SR capability component 254 can determine whether a VM 130A-N supports surprise removal without using a special helper VM 131. The SR capability component 254 can expose driver capability by using a special parameter. For example, VM 130N can include a device driver 139 that includes a list of parameters of the driver 139. The SR capability component 254 can access the driver 139 to determine whether a special parameter (e.g., a surprise removal support capability parameter) is included in the list of parameters of driver 139. For example, the SR capability component 254 can determine whether the surprise removal support capability parameter matches a parameter in the list of parameters of driver 139. If the special parameter is present, the SR capability component 254 can determine that the driver 139 supports surprise removal. If the special parameter is not present, the SR capability component 254 can determine that the driver 139 does not support surprise removal.

In embodiments, the SR capability component 254 can store, in mapping table 127 of hypervisor memory 260, an indicator indicating whether a VM 130A-N supports surprise removal.

Responsive to the SR capability component 254 determining that VM 130A-N does not support surprise removal, the VM launcher component 256 can launch the VM 130A-N using a virtual device and/or a virtual disk. Responsive to the SR capability component 254 determining that VM 130A-N supports surprise removal, the VM launcher component 256 can launch the VM 130A-N by enabling direct access to physical devices and/or hardware resources (e.g., via mapping the physical device memory to the VM virtual memory address range).

In embodiments, the hypervisor 125 can determine to remove one or more hardware resources and/or physical devices from a VM 130A-N. The resource removal component 258 of robust removal module 128 can determine how to remove the hardware resource and/or physical device from VM 130A-N. In embodiments, the resource removal component 258 can identify the indicator (e.g., in mapping table 127) associated with the corresponding VM 130A-N to determine whether the VM 130A-N supports surprise removal. Responsive to determining that the VM 130A-N from which a resource is to be removed supports surprise removal, the resource removal component 258 can remove the resource from the corresponding VM 130A-N by suspending the VM 130A-N and removing the physical device providing the resource. Removing the physical device may involve updating mapping table 127 to unmap the device assignment. In embodiments, the resource removal component 258. In embodiments, the resource removal component 258 can remove the physical device providing the resource from the VM 130A-N, e.g., without waiting for an acknowledgment from the VM 130A-N. If the resource removal component 258 determines that the VM 130A-N does not support surprise removal, the resource removal component 258 can remove the resource without suspending the corresponding VM 130A-N, by disabling a corresponding virtual device (not pictured).

FIG. 3 depicts a flow diagram of an example method 300 for providing robust resource removal for VMs, in accordance with one or more aspects of the present disclosure. Method 300 may be performed by processing logic (e.g., in computer system 100 of FIGS. 1 and 2) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by robust removal module 128 of FIGS. 1 and 2.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 310, processing logic may receive configuration data associated with a virtual machine. The processing logic may be operated by a hypervisor that manages the VM. The processing logic can receive the configuration data from a special helper VM (or helper VM). In embodiments, the hypervisor may launch a helper VM prior to launching the VM. The helper VM can have access to the memory allocated to the VM. The configuration data for the VM can be stored on memory allocated to the VM. The configuration data can include at least one of a version of a device driver installed on the VM, a version of a guest operation system installed on the VM, a list of driver(s) installed on the VM, or a vendor of a driver(s) installed on the VM.

At block 320, the processing logic may determine, based on the configuration data, a type of support by the VM of recovery from unexpected (or surprise) hardware resource removal. The processing logic may make this determination prior to launching the VM. In embodiments, the type of support of may be "support" or "no support." In embodiments, in order to determine the type of support by the VM of recovery from unexpected hardware resource removal, the processing logic may identify, in a data structure, an entry that corresponds to (or matches) the configuration data. The processing logic may determine, based on the identified entry, the type of support by the VM of recovery from unexpected hardware resource removal. For example, the entry may be associated with the guest OS version installed on the VM, and the entry may indicate whether that particular guest OS version provide unexpected hardware resource removal.

At block 330, the processing logic may identify, based on the type of support of recovery from unexpected hardware resource removal, a type of access of the VM to one or more hardware resources. The type of access can be direct access or virtual access. For example, for the type of support that is "no support," the type of access can be virtual device access, and for the type of support that is "support," the type of access can be direct access. In embodiments, direct access can include mapping the memory of the physical device(s) providing the one or more hardware resources to the VM virtual memory address range.

In embodiments, virtual device access can include intercepting the VM communications directed to the hardware resources supported by a device driver(s) and running the corresponding device driver(s) within the VM. For example, the processing logic may create one or more virtual devices and install them on the VM. Access requests by the VM directed to the one or more hardware resources assigned to the VM may be go through the virtual device(s) that manage the one or more hardware resources. The virtual device(s) can provide stability to the VM, e.g., when the hypervisor deallocate and/or reallocates hardware resources or physical devices from the VM.

At block 340, the processing logic may launch the VM according to the type of access to the one or more hardware resources. For example, the processing logic may launch the VM with direct access to the one or more hardware resources, or with virtual device access to the one or more hardware resources. In embodiments, the processing logic may store, in hypervisor memory, an indicator associated with the VM. The indicator can indicate the type of support by the VM of recovery from unexpected hardware resource removal. Additionally or alternatively, the processing logic may store an indicator associated with the VM, the indicator indicating the type of access of the VM to the one or more hardware resources.

In embodiments, the processing logic may determine to deallocate (and/or reallocate) one of the one or more hardware resources (e.g., one of the one or more hardware resources assigned to the VM). Responsive to determining that the type of support by the VM is support, processing logic may suspend the VM. Then, responsive to receiving an acknowledgment that the VM has been suspended, the processing logic may deallocate (and/or reallocate) the one of the one or more hardware resources. In some embodiments, responsive to determining that the type of support by the VM is support, the processing logic may remove, from the VM, a physical device that is providing the hardware resource to be deallocated.

FIG. 4 depicts a flow diagram of an example method 400 for determining the surprise removal capability of a VM using an exposed parameter, in accordance with one or more aspects of the present disclosure. Method 400 may be performed by processing logic (e.g., in computer system 100 of FIGS. 1 and 2) that may comprise hardware (e.g., circuitry, dedicated logic, programmable logic, microcode, etc.), software (such as instructions run on a processing device), firmware, or a combination thereof. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). In one embodiment, method 400 may be performed by robust removal module 128 of FIGS. 1 and 2.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 410, processing logic may identify, by a hypervisor, a device driver associated with a virtual machine (VM). In embodiments, the hypervisor may identifier the device driver binary stored on memory allocated to the VM.

At block 420, the processing logic may determine whether at least one parameter of a plurality of parameters associated with the device driver matches a surprise removal support capability parameter, wherein the surprise removal capability parameter indicates that the device driver supports surprise removal. That is, the processing logic may identify a list of parameters of the identify device driver, and the processing logic may determine whether one of the parameters in the list matches (or corresponds to) the surprise removal capability parameter. In embodiments, the presence of the surprise removal capability parameter in the list of parameters can indicate the surprise removal support capability of the driver.

At block 430, responsive to determining that the at least one parameter of the plurality of parameters associated with the device driver matches the surprise removal support capability parameter, the processing logic may launch the VM with direct access to one or more hardware resources supported by the device driver (e.g., via mapping the memory of the physical device providing the one or more hardware resources to the VM virtual memory address range).

In embodiments, responsive to determining that the VM does not support recovery from removal of one or more hardware resources assigned to the VM, the processing logic can launch the VM and provide the VM access to the one or more hardware resources through a virtual device. In embodiments, the processing logic can create one or more virtual devices to manage the one or more hardware resources assigned to the VM, and can install the virtual devices on the VM. Access requests from the VM directed to one of the one or more hardware resources can be sent through the virtual device that manages the hardware resource. The virtual device(s) can provide stability to the VM, e.g., when the hypervisor deallocates and/or reallocates hardware resources and/or physical devices from the VM.

In some embodiments, processing logic may determine to deallocate (and/or reallocate) one of the one or more hardware resources assigned to the VM. Responsive to determining that the VM supports recovery from removal of one or more hardware resources (i.e., responsive to determining that the at least one parameter of the plurality of parameters associated with the device driver matches the surprise removal support capability parameter), the processing logic may suspend the VM. Then, responsive to receiving an acknowledgment that the VM has been suspended, the processing logic may deallocate (and/or reallocate) the one of the one or more hardware resources. The acknowledged may be a notification received from the guest OS of the VM.

In some embodiments, the processing logic may store, in hypervisor memory, an indicator associated with the VM. The indicator can indicate whether the VM supports recovery from removal of one or more hardware resources assigned to the VM. For example, responsive to determining that the at least one parameter of the plurality of parameters associated with the device driver does not match the surprise removal support capability parameter, the processing logic may determine that the VM does not support recovery from unexpected removal of hardware resources. Conversely, responsive to determining that the at least one parameter of the plurality of parameters associated with the device driver matches the surprise removal support capability parameter, determine that the VM supports recovery from unexpected removal of the hardware resources. The processing logic may then set an indicator associated with the VM to indicate whether the VM supports recovery from unexpected removal of hardware resources or not.

Figure 5:
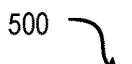
FIG. 5 depicts a block diagram of an example computer system, in accordance with one or more aspects of the present disclosure.

FIG. 5 depicts a block diagram of a computer system 500, operating in accordance with one or more aspects of the present disclosure. Computer system 500 may be the same or similar to computer system 100 of FIG. 1, and/or computer system 200 of FIG. 2. Computer system 500 may include a helper VM module 510, a type of support module 215, a type of access module 520, a VM launcher module 252, and/or a resource removal module 530. Computer system 500 can also include a memory 520 that can store type of access data 504 and type of support data 506.

In embodiments, the helper VM module 510 may enable a processor to launch a special helper virtual machine that has access to the memory allocated to a VM. The processor may launch the special helper VM prior to launching the VM. The helper VM module 510 identify relevant configuration data stored on the memory allocated to the VM. The helper VM module 510 can instruct the special helper VM which of the configuration data is relevant. The relevant configuration data can include the information related to the OS installed on the VM (e.g., version number of the guest OS), the drivers installed on the VM, the version number(s) of the driver(s) installed on the VM, the vendor of the guest OS or the driver(s), etc.

The type of support module 515 may enable a processor to determine, prior to launching the VM, the type of support by the VM of recover from unexpected (or surprise) hardware resource removal. The type of support may be "support" or "no support," for example. The type of support module 515 may enable the processor to store the determined type of support in memory 502, e.g., in type of support data 506. In some instances, the type of support data 506 may be a binary value, with "0" representing "support," and "1" representing "no support."

In embodiments, the type of support module 515 can determine the type of support by comparing the configuration data received from the special helper VM to a database. For example, the database can store metadata about various operating systems (including OS versions), and/or about various drivers (including driver versions). The database can be a key-value database, in which the configuration data received from the special helper VM can be used as the key to identify values associated with the configuration data. The values can indicate whether the configuration data supports surprise removal of hardware resources.

In embodiments, the type of support module 515 can enable the processor to access a driver store in the memory allocated to the VM directly. The driver capability can be exposed using a special parameter. For example, the type of support module 515 determine whether a surprise removal support capability parameter is found in the list of parameters of the driver. If it is, the type of support module 515 can determine that the type of support is "support." If it is not found, the type of support module 515 can determine that the type of support is "no support."

The type of access module 520 may enable the processor to determine, prior to launching the VM, the type of access associated with the VM. The type of access module 520 may identify the type of support associated with the VM (e.g., by identifying the type of support data 506 associated with the VM). If the type of support is "support" for the VM, the type of access module 520 may determine that the type of access is direct access. If the type of support is "no support" for the VM, the type of access module 520 may determine that the type of access is virtual access. The type of access module 520 may store the determined type of access in type of access data 504.

The VM launcher module 525 may enable the processor to launch the VM according to the type of access. The VM launcher module 525 may identify the type of access data 504 to identify the type of access associated with the VM. The VM launcher module 525 may then launch the VM according to the identified type of access. If the type of access is direct access, the VM launcher module 525 may enable the processor to launch the VM with direct access to one or more hardware resources. If the type of access is virtual access, the VM launcher module 525 may enable the processor to launch the VM with virtual access to one or more hardware resources.

The resource removal module 530 may enable the processor to remove one or more hardware resources assigned to the VM. In embodiments, the resource removal module 530 may detect that a hardware resource provided by a physical device is to be deallocated from the VM. The resource removal module 530 may identify the type of access data 504 associated with the VM (and/or may identify the type of support data 506 associated with the VM). If the type of access for the VM is "direct access" (or if the type of support for the VM is "support"), the resource removal module 530 may deallocate the hardware resource and/or physical device, e.g., by unmapping the device assignment in a mapping data structure. If the type of access for the VM is "virtual access" (or if the type of support for the VM is "no support"), the resource removal module 530 may deallocate the device by, e.g., sending a removal notification to the guest OS of the VM and waiting for an explicit acknowledgment from the guest OS that indicates that the gust OS has entered a state in which it is safe to remove the device.

Figure 6:
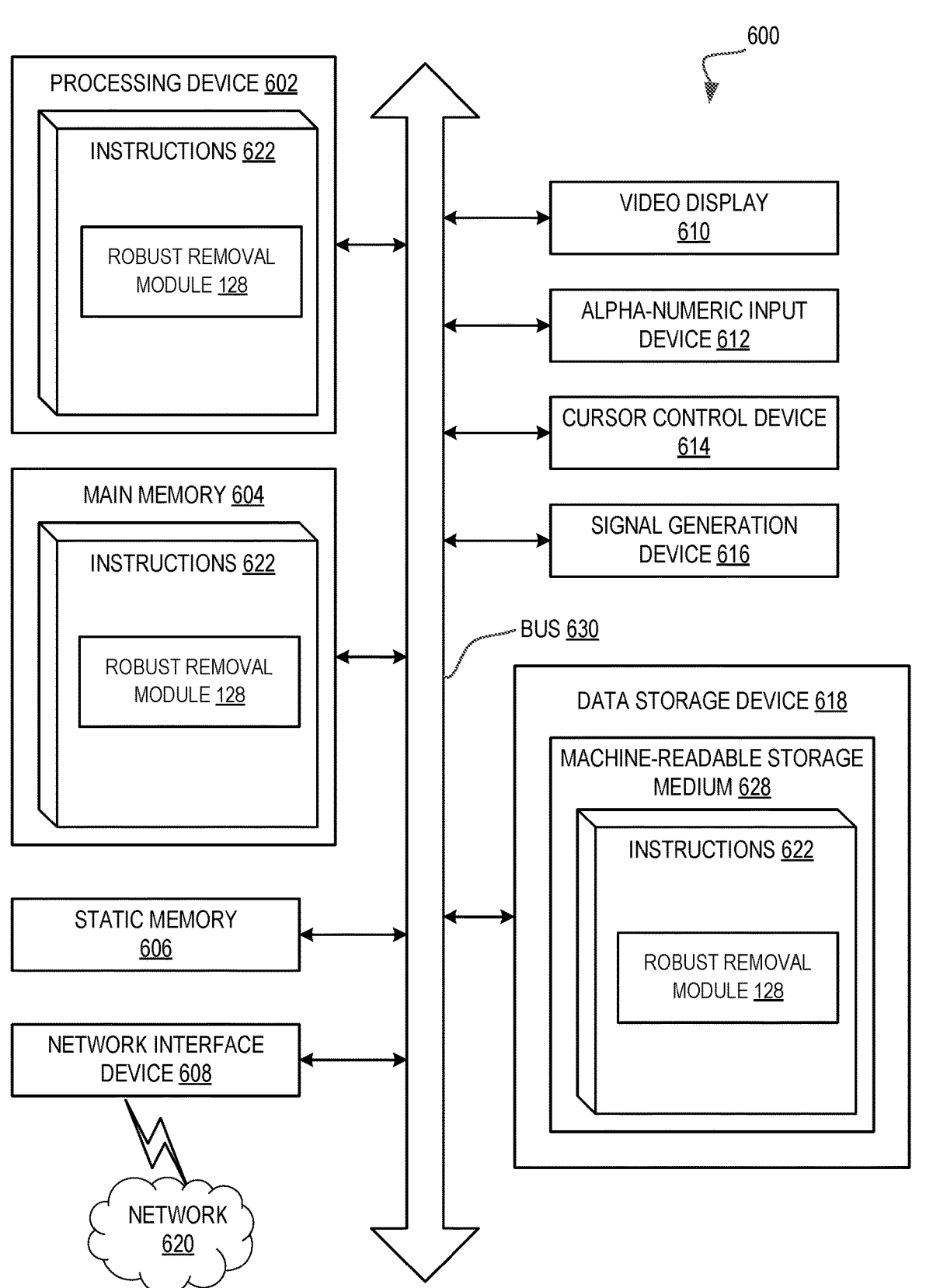
FIG. 6 depicts a block diagram of an illustrative computer system operating in accordance with one or more aspects of the present disclosure.

FIG. 6 is a diagrammatic representation of a machine in the exemplary form of a computer system 600 within which a set of instructions for causing the machine to perform any one or more of the methodologies discussed herein may be executed. In various illustrative examples, computer system 600 may correspond to computer system 100 of FIGS. 1 and 2. Computer system 600 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 600 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 600 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute robust removal module 128 for programming the operations and steps discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., robust removal module 128) embodying any one or more of the methodologies of functions described herein. The robust removal module 128 may also reside, completely or at least partially, within main memory 604 and/or within processing device 602 during execution thereof by computer system 600; main memory 604 and processing device 602 also constituting machine-readable storage media. Robust removal module 128 may further be transmitted or received over a network 626 via network interface device 608.

Machine-readable storage medium 620 may also be used to store the device queue manner logic persistently. While machine readable storage medium 620 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EE-PROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
launching a first virtual machine (VM) with access to memory allocated to a second VM;
tasking the first VM with identifying configuration data in the memory allocated to the second VM that indicates a type of support by the second VM of recovery from unexpected hardware resource removal and transmitting the configuration data identified by the first VM in the memory allocated to the second VM to a hypervisor operating on a host operating system;
receiving, by the hypervisor operating on the host operating system, the configuration data identified by the first VM in the memory allocated to the second VM, wherein the second VM is separate from the first VM;
determining, based on the configuration data, the type of support by the second VM of recovery from unexpected hardware resource removal;
identifying, based on the type of support of recovery from unexpected hardware resource removal, a type of access of the second VM to one or more hardware resources; and
launching the second VM according to the type of access to the one or more hardware resources.

2. The method of claim 1, wherein the type of support is no support, and wherein the type of access is virtual device access.

3. The method of claim 1, wherein the type of support is support, and wherein the type of access is direct access.

4. The method of claim 1, further comprising:
determining, by the hypervisor, to deallocate one of the one or more hardware resources;
responsive to determining that the type of support by the second VM is support, suspending the second VM; and

responsive to receiving an acknowledgment that the second VM has been suspended, deallocating the one of the one or more hardware resources.

5. The method of claim 1, further comprising:
determining, by the hypervisor, to deallocate one of the one or more hardware resources assigned to the second VM, wherein the one of the one or more hardware resources is part of a physical device; and
responsive to determining that the type of support by the second VM is support, removing the physical device from the second VM.

6. The method of claim 1, wherein determining, based on the configuration data, the type of support by the second VM of recovery from unexpected hardware resource removal of comprises:
identifying, in a data structure, an entry that corresponds to the configuration data; and
determining, based on the identified entry, whether the second VM supports recovery from removal of the one or more hardware resources.

7. The method of claim 1, further comprising:
storing, in hypervisor memory, an indicator associated with the second VM, wherein the indicator indicate the type of support by the second VM of recovery from unexpected hardware resource removal.

8. The method of claim 1, wherein the configuration data comprises at least one of a version of a device driver installed on the second VM, a version of a guest operating system installed on the second VM, a list of drivers installed on the second VM, or a vendor of a driver installed on the second VM.

9. A system comprising:
a memory; and
a processing device operatively coupled to the memory, the processing device to:
launch a first virtual machine (VM) with access to memory allocated to a second VM;
task the first VM with identifying configuration data in the memory allocated to the second VM that includes information related to a device driver installed on the second VM and transmitting the configuration data identified by the first VM in the memory allocated to the second VM to a hypervisor;
receive, by the hypervisor, the configuration data identified by the first VM in the memory allocated to the second VM, wherein the second VM is separate from the second VM;
identify, by the hypervisor, the device driver installed on the second VM based on the configuration data;
determine whether at least one parameter of a plurality of parameters associated with the device driver matches a surprise removal support capability parameter, wherein the surprise removal support capability parameter indicates that the device driver supports surprise removal of one or more hardware resources supported by the device driver; and
responsive to determining that the at least one parameter of the plurality of parameters associated with the device driver matches the surprise removal support capability parameter, launching the second VM with direct access to the one or more hardware resources supported by the device driver via mapping physical device memory of the one or more hardware resources to a virtual memory address range of the second VM.

10. The system of claim 9, wherein the processing device is further to:

responsive to determining that the at least one parameter of the plurality of parameters associated with the device driver does not match the surprise removal support capability parameter, launch the second VM; and providing the second VM access to the one or more hardware resources through a virtual device.

11. The system of claim 9, wherein the processing device is further to:

determine, by the hypervisor, to deallocate one of the one or more hardware resources assigned to the second VM;

responsive to determining that the at least one parameter of the plurality of parameters associated with the device driver matches the surprise removal support capability parameter, suspend the second VM; and responsive to receiving an acknowledgment that the second VM has been suspended, deallocate the one of one or more hardware resources.

12. The system of claim 9, wherein the processing device is further to:

responsive to determining that the at least one parameter of the plurality of parameters associated with the device driver does not match the surprise removal support capability parameter, determine that the second VM does not support recovery from unexpected removal of hardware resources;

responsive to determining that the at least one parameter of the plurality of parameters associated with the device driver matches the surprise removal support capability parameter, determine that the second VM supports recovery from unexpected removal of the hardware resources; and store, in hypervisor memory, an indicator associated with the second VM, wherein the indicator indicates whether the second VM supports recovery from unexpected removal of the hardware resources.

13. A non-transitory computer-readable media storing instructions that, when executed, cause a processing device to:

launch a first virtual machine (VM) with access to memory allocated to a second VM;

task the first VM with identifying configuration data in the memory allocated to the second VM that indicates a type of support by the second VM of recovery from unexpected hardware resource removal and transmitting the configuration data identified by the first VM in the memory allocated to the second VM to a hypervisor operating on a host operating system;

receive, by the hypervisor operating on the host operating system, the configuration data identified by the first VM in the memory allocated to the second VM, wherein the second VM is separate from the second VM;

determine, based on the configuration data, a type of support by the second VM of recovery from unexpected hardware resource removal;

identify, based on the type of support of recovery from unexpected hardware resource removal, a type of access of the second VM to one or more hardware resources; and launch the second VM according to the type of access to the one or more hardware resources.

14. The non-transitory computer-readable media of claim 13, wherein the type of support is no support, and wherein the type of access is virtual device access.

15. The non-transitory computer-readable media of claim 13, wherein the type of support is support, and the type of access is direct access.

16. The non-transitory computer-readable media of claim 13, further comprising:

determining, by the hypervisor, to deallocate one of the one or more hardware resources assigned to the second VM, wherein the one of the one or more hardware resources is part of a physical device; and responsive to determining that the type of support by the second VM is support, removing the physical device from the second VM.

17. The non-transitory computer-readable media of claim 13, wherein determining, based on the configuration data, the type of support by the second VM of recovery from unexpected hardware resource removal comprises:

identifying, in a data structure, an entry that corresponds to the configuration data; and determining, based on the identified entry, whether the second VM supports recovery form removal of the one or more hardware resources.

18. The non-transitory computer-readable media of claim 13, wherein the configuration data comprises at least one of a version of a device driver installed on the second VM, a version of a guest operating system installed on the second VM, a list of drivers installed on the second VM, or a vendor of a driver installed on the second VM.

19. The non-transitory computer-readable media of claim 13, further comprising:

storing, in hypervisor memory, an indicator associated with the second VM, wherein the indicator indicates the type of support by the second VM of recovery from unexpected hardware resource removal.

20. The non-transitory computer-readable media of claim 13, further comprising:

determining, by the hypervisor, to deallocate one of the one or more hardware resources;

responsive to determining that the type of support by the second VM is support, suspending the second VM; and responsive to receiving an acknowledgment that the second VM has been suspended, deallocating the one of the one or more hardware resources.

* * * * *